US008293143B2

(12) United States Patent
Chartier et al.

(10) Patent No.: US 8,293,143 B2
(45) Date of Patent: Oct. 23, 2012

(54) METHOD OF PREPARING A THIN CERAMIC COMPOSITION WITH TWO MATERIALS, THE COMPOSITION THUS OBTAINED AND THE CONSTITUENT ELECTROCHEMICAL CELL AND MEMBRANE

(75) Inventors: Thierry Chartier, Feytiat (FR); Francois Guillotin, Marly (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 737 days.

(21) Appl. No.: 12/028,932

(22) Filed: Feb. 11, 2008

(65) Prior Publication Data
US 2008/0277632 A1    Nov. 13, 2008

Related U.S. Application Data

(63) Continuation of application No. 10/482,559, filed as application No. PCT/FR02/01659 on May 16, 2002, now Pat. No. 7,332,108.

(30) Foreign Application Priority Data
Jul. 4, 2001 (FR) ...................................... 01 08895

(51) Int. Cl.
*H01B 1/02* (2006.01)

(52) U.S. Cl. .................. 252/519.2; 252/500; 252/518.1; 252/520.4; 204/252; 204/265; 95/54; 95/39; 96/11

(58) Field of Classification Search ............... 252/519.1, 252/373, 500, 518.1; 204/252, 265; 95/54, 95/39; 96/11
See application file for complete search history.

(56) References Cited

U.S. PATENT DOCUMENTS

| 5,094,927 | A | * | 3/1992 | Baucke et al. | 429/33 |
| 5,547,494 | A | * | 8/1996 | Prasad et al. | 95/54 |
| 5,683,797 | A | * | 11/1997 | Carolan et al. | 428/307.3 |
| 5,820,654 | A | * | 10/1998 | Gottzman et al. | 95/54 |
| 6,264,807 | B1 | * | 7/2001 | Fenner et al. | 204/252 |
| 6,635,339 | B1 | * | 10/2003 | Adler et al. | 428/307.7 |

* cited by examiner

*Primary Examiner* — Mark Kopec
*Assistant Examiner* — Haidung Nguyen
(74) *Attorney, Agent, or Firm* — Christopher J. Cronin (57) ABSTRACT

A method to prepare a thin ceramic or metallic solid-state composition comprising three phases: a material (A), a material (B), and pores, wherein the porous matrix of material (A) has a porosity gradient in the range of about 0% to about 80%, and wherein the pores are partially or completely filled with material (B). Various compositions and methods of use for the prepared composition are also disclosed.

6 Claims, 5 Drawing Sheets

|  |  | Photograph number | | |
|---|---|---|---|---|
|  |  | 1 | 2 | 3 |
| Volume composition (%) | Solvent + polypropylene wax | 100% | 95% | 90% |
|  | Binder | 0% | 2.5% | 5% |
|  | Plasticizer | 0% | 2.5% | 5% |

METHOD OF PREPARING A THIN CERAMIC COMPOSITION WITH TWO MATERIALS, THE COMPOSITION THUS OBTAINED AND THE CONSTITUENT ELECTROCHEMICAL CELL AND MEMBRANE

CROSS REFERENCE TO RELATED APPLICATIONS

This application is a continuation of U.S. Ser. No. 10/482,559, filed on Dec. 30, 2003, which is a 371 application of PCT/FR02/01659, filed on May 16, 2002, which claims priority to French application FR 01-08895, filed on Jul. 4, 2001.

BACKGROUND OF THE INVENTION

1. Field of the Invention

The subject of the invention is a novel method for preparing a thin ceramic and/or metallic solid-state composition consisting of three phases: a material (A), a material (B) and pores. The concentration of each phase varies continuously from one face of the article to the other in a continuous and controlled gradient. The porous matrix of material (A) has a porosity gradient of 0% to about 80%, the pores being completely or partly filled with material (B). The concentration of material (B) in the article therefore varies from 80% to 0% of small thicknesses.

2. Related Art

Porous ceramics have physico-chemical properties, whether thermal stability, chemical stability, biocompatability or mechanical strength, which make them good candidates for various applications such as filter membranes, sensors, ceramic-to-metal seals, biomaterials, energy conservation, thermal insulation or catalysis. These materials are used in particular for their low density, their high exchange area and their high permeability thanks to their open porosity.

As techniques for creating porosity in a ceramic, there are:
  incomplete sintering of ceramic particles;
  the introduction of porosity by emulsion of the material before sintering;
  the use of pore formers removed before sintering;
  forming operations such as extrusion, injection molding, rapid prototyping; and
  the use of ceramic fibers.

These methods are listed in Roy W. Rice, "Porosity of ceramics", Marcel Dekker, 1998, pp 20-21.

Incomplete sintering or subsintering of a ceramic powder or of a blend of ceramic powders having different particle sizes does not allow a porosity of greater than 50% to be achieved.

The use of pore formers, removed for example by pyrolysis before sintering, and leaving pores as the negative thereof in the ceramic, is one of the most appropriate methods for producing materials whose porosity is controlled in terms of volume fraction, shape and size distribution of the pores. Incorporating particulate pore formers, such as starch, lattices, graphite or resins into ceramic suspensions or slurries makes it possible to obtain uniformly distributed pores in a dense ceramic matrix. Depending on the forming method—pressing, casting in a mold, tape casting, extrusion or injection molding—a material is obtained with a plane geometry, a tubular geometry or a geometry of more complex shape.

Several embodiments of this technique of incorporating pore-forming particles into a ceramic suspension are disclosed in United States patents published under the numbers U.S. Pat. No. 4,777,153, U.S. Pat. No. 4,883,497, U.S. Pat. No. 5,762,737, U.S. Pat. No. 5,846,664 and U.S. Pat. No. 5,902,429 and in the publications by Lyckfeldt et al. and Apté et al. (O. Lyckfeldt, E. Lidén, R. Carlsson, "Processing of thermal insulation materials with controlled porosity", Low expansion materials, pp 217-229; S. F. Corbin, P. S. Apté, J. Am. Ceram. Soc., 82, 7, 1999, pp 1693-1701). Apté et al. describe in particular a method using the tape casting of ceramic suspensions containing pore-forming particles and the thermocompression of tapes in order to obtain, after sintering, a porous material with a discrete porosity gradient.

The pore former may also be a preform impregnated with a ceramic suspension (ceramic powder+solvent+organic additives).

The infiltration of polymer foams by a ceramic suspension is used to obtain bulk ceramics having a substantial open porosity. In this case, the total porosity is directly due to the structure of the foam, but this technique does not allow micron pore sizes to be achieved and cannot be used to prepare thin materials.

U.S. Pat. No. 4,780,437 discloses a method for preparing thin porous materials by infiltration of a flocking of pyrolyzable pore-forming fibers by a ceramic suspension. The materials obtained by this method have oriented anisotropic pores.

Controlling the structure, whether as a dense system or a porous system with a porosity gradient, and controlling the microstructure, especially the particle size distribution and the pore size distribution of a ceramic article, is a key factor as regards its intrinsic properties and as regards its applications in terms of performance, reproducibility, lifetime and cost.

At the present time, it is not known how to manufacture a thin ceramic membrane, having a thickness of a few hundred microns, possessing a continuous controlled surface porosity gradient ranging from 0% (dense ceramic) to about 80% (highly porous system) in a single operation. All the articles produced using the various known methods have discrete or discontinuous controlled porosity gradients. Now, the presence, even in the same material, of these discrete porosity gradients may cause, at the various interfaces, layer debonding and delamination phenomena, especially because of the differences in thermal expansion coefficients between these regions. This results in rapid degradation of the article.

The fact of being able to produce a continuous controlled surface porosity gradient in a material should prevent the succession of interfaces between the layers of different porosity and consequently avoid these degradation phenomena.

In the production of electrochemical cells formed from a dense solid-state electrolyte and electrodes, called volume electrodes, such as those described in international patent application WO 95/32050, the fact of controlling a microstructure of the solid-state electrolyte with a continuous controlled surface porosity gradient completely or partly filled with an electrode material should make it possible:
  to promote physical compatibility and chemical compatibility between volume electrode and dense solid-state electrolyte and thus improve the cohesion of the interface between these two materials;
  to limit the energy costs associated with interfacial overpotentials; and
  to promote the diffusion, disassociation and recombination of oxygen throughout the three-dimensional edifice of the volume electrode/dense solid-state electrolyte porous structure, by uniformly delocalizing volumewise the electrode reaction.

The electrochemical cells thus formed have improved performance in terms of electrochemical performance (current density applied per unit area), lifetime, aging (degradation) and energy cost.

In the case of the production of solid-state fuel cells or SOFCs (solid oxide fuel cells), these are formed from a dense solid-state electrolyte of small thickness (between 5 µm and 300 µm, preferably between 10 µm and 100 µm) deposited either on the anode electrode (fuel side) or on the cathode electrode (air side). The fact of controlling a solid-state electrolyte structure/microstructure (thickness, density, particle size, porosity with a continuous compositional gradient created by total or partial filling of a continuous controlled surface porosity gradient of one of the "support" electrode (anode or cathode) materials should make it possible:

- to promote physical compatibility and chemical compatibility between said anode (fuel) or cathode (air) "support" electrode and the dense solid-state electrolyte and thus improve the cohesion of the interface between these two materials;
- to limit the energy costs associated with interfacial overpotentials and with the thickness of the solid-state electrolyte; and
- to promote the diffusion, dissociation and recombination of oxygen throughout the three-dimensional edifice of the "anode or cathode" volume electrode/dense solid-state electrolyte porous structure by uniformly delocalizing volumewise the electrode reaction.

The solid-state fuel cell elements thus formed have improved performance in terms of productivity (higher power produced per unit area), lowered operating temperature, lifetime, aging (degradation) and energy cost.

In the case of the production of a catalytic membrane ceramic reactor for the reaction for example, of reforming methane into a syngas according to the chemical reaction $CH_4 + \frac{1}{2}O_2 \rightarrow 2H_2 + CO$, the dense membrane is a material having a crystal structure of the $ABO_3$, $AA'BB'O_6$ (A,A': lanthanide and/or actinide; B,B': transition metal), brown-millerite and/or pyrochlore perovskite type. The material possesses mixed conductivity properties and is deposited in the form of a dense membrane (density>94%) with a thickness of between 5 µm and 500 µm, preferably between 10 µm and 300 µm, on a porous support of the same chemical composition or of a different chemical composition. The fact of controlling a structure/microstructure (thickness, density, particle size, residual porosity) of the dense (mixed conducting) membrane with a continuous compositional gradient by total or partial filling of a continuous controlled surface porosity gradient of the support should make it possible:

- to promote physical compatibility and chemical compatibility between said porous support and the dense mixed conducting membrane and thus improve the cohesion of the interface between these two materials;
- to increase the flux of oxygen produced, this flux being, according to Wagner's law, inversely proportional, for a given working range, to the thickness of the dense membrane;
- to promote the diffusion, dissociation and recombination of oxygen throughout the three-dimensional edifice of the porous structure of the support if the latter is of the same chemical composition as the membrane; and
- to improve the mechanical integrity of the membrane reactor essentially by virtue of the mechanical properties of the support.

The mixed conducting ceramic membrane for the methane reforming reaction should show improved performance in terms of oxygen flux per unit area, lowering of the working temperature, lifetime, aging (degradation) and mechanical integrity in a reducing medium compared with a self-supported system.

In this application—reforming—a catalyst is deposited on the surface of a thin dense membrane that may or may not have a developed surface and surface roughness, said membrane being supported on a porous support of the same nature or of a different chemical nature.

SUMMARY OF THE INVENTION

This is why the subject of the invention is a method for preparing a thin solid-state composition, essentially formed from a ceramic and/or metallic material (A) having, within said composition, a surface concentration gradient of a ceramic and/or metallic material (B) of chemical composition identical to or different from that of material (A), characterized in that it comprises the following successive steps:

a step (1) of infiltrating a porous pore-forming substrate of controlled thickness with a suspension of a material (A) in a solvent;
a step (2) of solvent evaporation, in order to form a pore former/material (A) composite structure;
a debinding step (3);
a sintering or presintering step (4);
a step (5) of total or partial filling of the porosity created on the surface of material (A) by material (B) or a precursor of said material (B), as the case may be and if desired;
a step (5') of heat treatment; and in all cases
a step (6) of sintering or cosintering the assembly obtained in either of steps (5) and (5').

BRIEF DESCRIPTION OF THE DRAWINGS

Description of Preferred Embodiments

For a further understanding of the nature and objects for the present invention, reference should be made to the following detailed description, taken in conjunction with the accompanying drawings, in which like elements are given the same or analogous reference numbers and wherein.

In the definition of the method forming the subject of the present invention, the term "thin" is generally understood to mean a total thickness of between about 0.05 mm and about 5 mm and more particularly between about 0.25 mm and about 2 mm.

In the definition of the method forming the subject of the present invention, the expression "continuous controlled surface porosity gradient" indicates that the porosity of said material varies from a value tending toward 0%, at one of its faces (called the dense surface), to a value tending toward about 80% at its opposite face (called the porous face).

The term "surface porosity" is understood to mean the pores on the surface of material (A) accessible either to a gas, liquid or supercritical fluid, for example to a gas or a gas mixture such as air or natural gas, for the operation of a purely ionic or mixed conducting ceramic membrane, or to a liquid such as a suspension or a molten metal, for an infiltration operation.

When the material is intended for the manufacture of a membrane allowing oxygen ions to pass through it, the porosity of the material at the dense face is around 0%. It is less than or equal to 80% and more particularly equal to about 60% at the porous face.

The expression "porous pore-forming substrate" denotes a porous stack of solid pore-forming particles or of a blend of solid pore-forming particles, of the same or different size and/or shape and/or nature. The porosity of the substrate is between about 20% and about 90% and preferably greater than or equal to 30% and less than or equal to 70%, and more particularly approximately equal to 40%. The porosity of the porous pore-forming substrate corresponds to the interstices between the pore former or formers, whether these be particles, flakes or fibers. This interconnected stack porosity, also called open porosity, allows infiltration by the ceramic suspension.

The term "pore former" denotes any material capable of being removed, by thermal decomposition or etching during the debinding step prior to sintering, leaving pores in the material obtained after this step and without leaving residues. As pore formers, it is preferred to use polymers existing in particulate form and in relatively isotropic form such as, for example, micronized polypropylene waxes (for example, PropylTex™270S or PropylTex™325S from MicroPowders, Inc.), polyamides (for example, ORGASOL™ from Elf Atochem), latexes, polytetrafluoroethylene or polystyrene spheres. As pore formers, cellulose fibers (for example ARBOCEL™BE600-10 from Rettenmeier), starches (for example standard corn starch, SP standard wheat starch or potato starch from Roquette Frères, or REMYRISE™DR rice starch from Rémy) or graphite are also used.

The term "of material suspension (A)" indicates that the suspension has a suitable viscosity and suitable rheological behavior for it to infiltrate into the porous pore-forming substrate so as to induce a continuous pore-filling gradient, ranging from 0% filling of the pores, at the face opposite the infiltration face, up to about 100% at the infiltration face.

Step (1), the infiltration step, is carried out, for example, by the technique called tape casting. The tape casting technique is carried out by means of a casting bed. This technique is particularly appropriate when it is desired to obtain a ceramic material of planar shape. It is also possible to use it to produce tubes by winding, for example around a mandrel, dense ceramic sheets filled with pore-forming particles, or to produce corrugated structures by a forming or thermoforming operation on a preform.

The gradient of infiltration of the porous pore-forming substrate with the suspension is obtained by controlling its viscosity and its rheological behavior. Thus, increasing the proportion of organic phase in the suspension of pore-forming particles reduces the porosity of the substrate by closing up the interstices between the pore-forming entities and making it more difficult for the suspension of given viscosity to infiltrate. Increasing the viscosity of the suspension also makes infiltration of the porous pore-forming substrate more difficult.

Step (2), the solvent evaporation step, is, if necessary, carried out by circulation of a stream of hot air.

Step (3), the debinding step, consists in eliminating the pore formers and the various organic auxiliaries used to implement the above steps of the method by thermal decomposition or etching.

Step (4), the presintering or sintering step, consists of a heat treatment for consolidating and/or densifying material (A) around the pores developed by the pore former. During this heat treatment thermally activated diffusion phenomena are responsible for the transportation of material and, consequently, the consolidation of the structure and the densification of the material. The sintering generally consists of a heat treatment at an optimum temperature.

The term "optimum sintering temperature" denotes the temperature, below the melting point or decomposition temperature of the material, for which densification is at a maximum and grain growth is limited. In the case of materials of the family of BIMEVOX compounds, the sintering temperature is between 700 and 850° C. and a mean particle size after sintering of less than 5 μm and preferably less than 3 μm will be preferred.

A presintering operation consists of a simple consolidation of the material, either without densification or with a slight densification, at a temperature below the sintering temperature of the material. The purpose of the consolidation is to ensure cohesion during the subsequent step of filling the pores of material (A).

Steps (3) and (4) may be carried out during one and the same operation as a single step (3') called the debinding-presintering or debinding-sintering step.

Step (5), of total or partial filling of the porosity created on the surface of material (A) by a material (B) or precursor of said material (B), may be carried out by infiltration or by impregnation with a liquid containing material (B) or a precursor of said material (B), by chemical vapor deposition (CVD) of a gas containing material (B) or its precursor, or by deposition, in a supercritical phase, of a fluid containing material (B) or its precursor.

The expression "precursor of material B" is understood to mean a compound (an organic molecule, an organometallic, a salt, etc.) allowing material (B) to be obtained after a heat treatment.

Step (5), of total or partial filling of the pores, may include the evaporation of a solvent.

Step (6), of sintering or cosintering the material (A)/material (B) combination, consists of a heat treatment for consolidating and densifying material (B), or even of densifying the presintered material (A). This step may also allow a precursor of material (B) to decompose in order to form material (B).

In all cases, this heat treatment is carried out at a temperature less than or equal to the sintering temperature of material (A). This step also makes it possible to achieve good cohesion of the interface between material (A) and material (B). This step may also include a debinding operation, by thermal decomposition or etching, in order to remove the various organic auxiliaries used for the total or partial filling of the pores created on the surface of material (A) by material (B) or a precursor of said material (B).

According to a first variant of the method as defined above, the composite structure (S) resulting from step (2) undergoes a step (2') of cutting into structure elements (s). The elements (s) obtained are preferably of identical shape and size.

When it is desired to produce either a solid-state electrolyte or a supported mixed conducting membrane, two elements ($s_1$) and ($s_2$) obtained in step 2') may be stacked back-to-back, their dense faces being adjacent, in order to form an assembly (H), which then undergoes thermocompression followed by steps (3) and (4), or by step (3'), then by steps (5) and (6) of the method as defined above.

In this case, the dimensions of the die for thermocompression of the assembly (H) may be tailored to the dimensions of the elements s, ($s_1$) and ($s_2$).

The thermocompression operation carried out on the assembly (H) generally consists of pressing the latter under a pressure of about 50 MPa for 5 to 10 minutes at a temperature above the glass transition temperature ($T_g$) of the organic phase used, which comprises the binder and the plasticizer. It is generally below 100° C.

According to a first particular aspect of the method forming the subject of the present invention, this comprises a prior step (P) of preparing the porous pore-forming substrate. This preparation more particularly comprises:
  a step ($P_a$) of preparing a suspension of one or more solid pore formers in a solvent, if necessary in the presence of binders, plasticizers and/or dispersants, and with, if so desired, the addition, in a small proportion, of ceramic and/or metallic particles or of precursors of a ceramic and/or metallic material to said suspension;
  a step ($P_b$) of casting said suspension formed in step ($P_a$) on a flat surface; and
  a step ($P_c$) of evaporating said solvent.

As solvent, a liquid may be chosen that is inert with respect to the pore formers and especially a liquid in which the pore formers are insoluble.

This is in general an organic solvent, for example methanol, ethanol, isopropanol, butanol, methyl ethyl ketone (MEK), an ethanol+MEK mixture or trichloroethylene.

As dispersant, a compound or a blend of compounds is chosen which results in the electrostatic and/or stearic repulsion of the pore formers, whether they be particles, fibers or flakes, in the solvent. It is preferable to choose a compound or a blend of compounds from the family of phosphoric esters, such as BEYCOSTAT™A259, or fluoroalkyl esters or alkyl ethoxylates.

As binder, a compound or a blend of compounds is chosen that is chemically compatible with the other constituents of the suspension and of the ceramic material optionally present. Preferably, a compound having a low glass transition temperature $T_g$ is chosen. More particularly, a compound soluble in the chosen solvent is chosen. Among compounds or blends of compounds commercially available, there are polyacrylics such as DEGALAN™ or polyvinyls such as polyvinyl butyrals.

As plasticizer, a commercially available compound or blend of compounds, which is known to possess this property, is chosen, such as phthalates, such as dibutyl phthalate or butyl phthalate or benzyl phthalate, or else polyethylene glycols. More particularly, a compound soluble in the chosen solvent is chosen.

As casting support, it is general practice to use a glass surface, a stainless steel or a plastic film such as, for example, a Mylar™ film or a polypropylene film.

Adding a binding agent and/or a plasticizing agent, in a small proportion, to the pore-former suspension makes it possible to obtain a porous polymer substrate that is flexible and able to be handled after solvent evaporation and that does not deteriorate during infiltration of the suspension of material (A). These compounds form bridging between the pore formers.

In general, the constituents of the suspension prepared in step ($P_a$) are chosen so that, after evaporation of the solvent, the pore-forming substrate formed does not adhere to the support on which the casting of said suspension is carried out and so that it does not crack.

If necessary, step ($P_b$) is preceded by a step ($P_d$) of deagglomerating the pore-forming particles in said suspension formed in step ($P_a$), said step ($P_d$) being optionally followed by a step ($P_e$) of deaerating said suspension.

Step ($P_d$) generally consists of breaking up the agglomerates by mechanical action, such as grinding, for example by attrition, or with ultrasound.

Step ($P_e$) generally consists of eliminating the air bubbles present in the suspension, for example by applying a vacuum, by rotating it in a jar or by screening.

Step ($P_b$) is carried out using the technique called tape casting. This technique is particularly appropriate when it is desired to obtain a ceramic material of thin planar shape. It may also be used to produce tubes by winding, for example around a mandrel, dense ceramic sheets filled with pore-forming particles, or to produce shaped, for example corrugated, structures by a forming or thermoforming operation on a preform.

The tape casting technique is carried out using a casting bed. Such a device is commercially available.

According to a second particular aspect of the method forming the subject of the present invention, this comprises a prior step (Q) of preparing a suspension of material (A) in a solvent optionally with the addition of pore-forming particles.

This preparation more particularly comprises:
  a step ($Q_a$) of preparing a suspension of particles of material (A) and optionally of pore-forming particles in a solvent, in the presence of a dispersant; and
  a step ($Q_b$) of adding a binder and a plasticizer and optionally a wetting agent to the suspension prepared in step ($Q_a$).

As solvent, a liquid is chosen that makes it possible to dissolve the organic auxiliaries used, such as the dispersants, binders or plasticizers. This is in general an organic solvent, for example methanol, ethanol, isopropanol, butanol, methyl ethyl ketone (MEK), an ethanol+MEK mixture or trichloroethylene.

As dispersant, a compound or a blend of compounds is chosen that is chemically compatible with the other constituents of the suspension and of the material (A). It is preferable to choose a compound or a blend of compounds from the family of phosphoric esters, such as BEYCOSTAT™A259, or fluoroalkyl esters or alkyl ethoxylates.

As binder, a compound or a blend of compounds is chosen that is chemically compatible with the other constituents of the suspension and of the material (A). Preferably, a compound having a low glass transition temperature $T_g$ is chosen. More particularly, a compound soluble in the chosen solvent is chosen. Among compounds or blends of compounds commercially available, there are polyacrylics such as DEGALAN™ or polyvinyls such as polyvinyl butyrals.

As plasticizer, a commercially available compound or blend of compounds, which is known to possess this property, is chosen, such as phthalates, such as dibutyl phthalate or butyl phthatate or benzyl phthalate, or else polyethylene glycols. More particularly, a compound soluble in the chosen solvent is chosen.

As wetting agent, a commercially available compound or blend of compounds, which is known to possess this property, is chosen, such as fluoroalkyl polymers.

This preparation may include a step ($Q_c$) of deagglomerating the suspension formed at step ($Q_a$) before it is subjected to step ($Q_b$).

Step ($Q_c$) generally consists in breaking up the aggregates by mechanical action, such as grinding, for example by attrition or by ultrasound.

For correct implementation of the method forming the subject of the present invention, it is preferable for the powder of material (A), of which the suspension is prepared in step ($Q_a$), to consist of particles of equiaxed shape with a narrow size distribution centered around a mean value of between 0.1 µm and 10 µm, preferably between 0.2 µm and 1 µm.

This preparation may also include a step ($Q_d$) of deaerating the suspension obtained in step ($Q_b$).

Step ($Q_d$) generally consists in removing the air bubbles present in the suspension, for example by applying a vacuum, by rotation in a jar or by screening.

According to a third particular aspect of the method forming the subject of the present invention, this comprises a prior step (R) of preparing a suspension of material (B) or of a precursor of said material (B), in a solvent, optionally with the addition of pore-forming particles.

This preparation more particularly comprises:
a step ($R_a$) of preparing a suspension of solid particles in a solvent, in the presence of a dispersant; and
a step ($R_b$) of adding, to the suspension prepared in step ($R_a$), a binder and a plasticizer and optionally a wetting agent.

As solvent, a liquid is chosen that makes it possible to dissolve the organic auxiliaries used, such as the dispersants, binders or plasticizers. This is in general an organic solvent, for example methanol, ethanol, isopropanol, butanol, methyl ethyl ketone (MEK), an ethanol+MEK mixture or trichloroethylene.

As dispersant, a compound or a blend of compounds is chosen that is chemically compatible with the other constituents of the suspension and of the material (B) of its precursors.

It is preferable to choose a compound or a blend of compounds from the family of phosphoric esters, such as BEYCOSTAT™A259, or fluoroalkyl esters or alkyl ethoxylates.

As binder, a compound or a blend of compounds is chosen that is chemically compatible with the other constituents of the suspension and of the material (B). Preferably, a compound having a low glass transition temperature $T_g$ is chosen. More particularly, a compound soluble in the chosen solvent is chosen. Among compounds or blends of compounds commercially available, there are polyacrylics such as DEGALAN™ or polyvinyls such as polyvinyl butyrals.

As plasticizer, a commercially available compound or blend of compounds, which is known to possess this property, is chosen, such as phthalates, such as dibutyl phthalate or butyl phthalate or benzyl phthalate, or else polyethylene glycols. More particularly, a compound soluble in the chosen solvent is chosen.

As wetting agent, a commerically available compound or blend of compounds, which is known to possess this property, is chosen, such as fluoroalkyl polymers.

This preparation may include a step ($R_c$) of deagglomerating the suspension prepared in step ($R_a$) before it is subjected to step ($R_b$).

This deagglomeration step generally consists in breaking up the agglomerates by mechanical action, such as grinding, for example by attrition or by ultrasound.

For correct implementation of the method forming the subject of the present invention, it is preferable for material (B) or its precursor, the suspension of which was prepared in step ($R_a$), to consist of a powder and more particularly of a powder of particles of equiaxed shape, with a narrow size distribution centered around a mean value of between 0.1 µm and 10 µm, preferably between 0.2 µm and 1 µm.

This preparation may also include a step ($R_d$) of deaerating the suspension resulting from step ($R_b$).

According to a fourth particular aspect of the method forming the subject of the present invention, materials (A) and (B), of identical or different compositions used, are metallic materials. The method thus used therefore makes it possible to obtain more particularly metal forms of high quality.

The metallic materials are mainly noble metals, such as platinum, palladium, gold or rhodium, or transition metals, such as for example nickel, chromium, manganese, tungsten, vanadium or niobium. They also be metal alloys.

According to a fifth particular aspect of the method forming the subject of the present invention, at least one of materials (A) and (B), of identical or different chemical compositions, is chosen from doped ceramic oxides which, at the operating temperature, are in the form of a crystal lattice having oxide ion vacancies, and more particularly in the form of a cubic phase, fluorite phase, Aurivillius-type perovskite phase, brown-millerite phase or pyrochlore phase. Among these there are:

(a)—oxides of formula (I):

$$(M_aO_b)_{1-x}(R_cO_d)_x \quad (I)$$

in which M represents at least one trivalent or tetravalent atom chosen mainly from bismuth (Bi), cerium (Ce), zirconium (Zr), thorium (Th), gallium (Ga) or hafnium (Hf), a and b are such that the $M_aO_b$ structure is electrically neutral, R represents at least one divalent or trivalent atom chosen mainly from magnesium (Mg), calcium (Ca) or barium (Ba), strontium (Sr), gadolinium (Gd), scandium (Sc), ytterbium (Yb), yttrium (Y), samarium (Sm), erbium (Er), indium (In), niobium (Nb) or lanthanum (La), c and d are such that the $R_cO_d$ structure is electrically neutral and x is generally between 0.05 and 0.30 and more particularly between 0.075 and 0.15.

As examples of oxides of formula (I), there are stabilized zirconias, gallates or cerium oxides, such as:
stabilized zirconia of formula (Ia):

$$(ZrO_2)_{1-x}(Y_2O_3)_x \quad (Ia)$$

in which x is between 0.05 and 0.15;
(b)—perovskite materials of formula (II):

$$[Ma_{1-x}Ma'_x][Mb_{1-y}Mb'_y]O_{3-w} \quad (II)$$

in which Ma and Ma', which are identical or different, are chosen from the families of alkaline-earth metals, lanthanides and actinides and more particularly from La, Ce, Pr, Nd, Pm, Sm, Eu, Gd, Tb, Dy, Ho, Er, Tm, Yb, Lu, Y or Mg, Ca, Sr or Ba, Mb and Mb', which are identical or different, represent one or more atoms chosen from the transition metals, and more particularly from Sc, Ti, V, Cr, Mn, Fe, Co, Ni, Cu, Zn or Ga, x and y, which are identical or different, are greater than or equal to 0 and less than or equal to 1 and w is such that the structure in question is electrically neutral.

As examples of oxides of formula (II), there are lanthanum nickel oxide ($LaNiO_3$), calcium lanthanum manganites ($Ca_uLa_vM_nO_w$), lanthanum strontium manganites ($La_uSr_vM_n O_w$), lanthanum strontium cobaltites ($La_uSr_vCoO_w$), lanthanum calcium cobaltites ($Ca_uLa_vCoO_w$) gadolinium strontium cobaltites ($Gd_uSr_vCoO_w$), lanthanum strontium chromites ($La_uSr_vCrO_w$) lanthanum strontium ferrites ($La_uSr_vFeO_w$) lanthanum strontium doped ferrites—transition metal ($La_uSr_vFe_cMb'dO_w$) lanthanum strontium ferrocobaltites ($La_uSr_vCo_dFe_cO_w$), for which compounds the sums u+v and c+d are equal to 1, and w is such that the structure in question is electrically neutral. There is more particularly a compound of formula (IIa):

$$La_{0.6}Sr_{0.4}Cu_{0.8}Fe_{0.2}O_w \quad (IIa)$$

in which w is such that the structure of formula (IIa) is electrically neutral.

(c)—materials of the brown-millerite family of formula (III):

$$[Mc_{2-x}Mc'_{x}][Md_{2-y}Md'_{y}]O_{6-w} \quad (III)$$

in which, Mc represents a metal or a mixture of metals of the family of alkaline-earth (Mg, Ca, Sr or Ba) compounds; Mc' represents a metal or a mixture of metals of the family of lanthanides and actinides and more particularly from La, Ce, Pr, Nd, Pm, Sm, Eu, Gd, Tb, Dy, Ho, Er, Tm, Yb, Lu or Y; Md represents a metal or a mixture of metals of the family of 3d transition metals and metals of group 13; and Md' represents a metal or a mixture of metals of the family of 3d transition metals, metals of group 13 or metals of the family of lanthanides or actinides, x and y are greater than or equal to 0 and less than or equal to 2, and w is such that the structure in question is electrically neutral. Among metals of group 13, aluminum (Al), gallium (Ga) or indium (In) are preferred for Md and Md'.

Among transition metals, cobalt (Co), titanium (Ti), vanadium (V), chromium (Cr), manganese (Mn), zinc (Zn), nickel (Ni) or iron (Fe) are prepared for Md and Md'.

As compounds of formula (III), there are more particularly compounds of formula (IIIa):

$$[Mc_{2-x}La_{x}][Md_{2-y}Fe_{y}]O_{6-w} \quad (IIIa)$$

compounds of formula (IIIb):

$$[Sr_{2-x}La_{x}][Ga_{2-y}Md'_{y}]O_{6-w} \quad (IIIb)$$

and more particularly compounds of formula (IIIc):

$$[Sr_{2-x}La_{x}][Ga_{2-y}Fe_{y}]O_{6-w} \quad (IIIc),$$

such as, for example, $Sr_{1.4}La_{0.6}GaFeO_{5.3}$, $Sr_{1.6}La_{0.4}Ga_{1.2}Fe_{0.8}O_{5.3}$, $Sr_{1.6}La_{0.4}GaFeO_{5.2}$, $Sr_{1.6}La_{0.4}Ga_{0.8}Fe_{1.2}O_{5.2}$, $Sr_{1.6}La_{0.4}Ga_{0.6}Fe_{1.4}O_{5.2}$, $Sr_{1.6}La_{0.4}Ga_{0.4}Fe_{1.6}O_{5.2}$, $Sr_{1.6}La_{0.4}Ga_{0.2}Fe_{1.8}O_{5.2}$, $Sr_{1.6}La_{0.4}Fe_{2}O_{5.2}$, $Sr_{1.7}La_{0.3}GaFeO_{5.15}$ $Sr_{1.7}La_{0.3}Ga_{0.8}Fe_{1.2}O_{5.15}$, $Sr_{1.7}La_{0.3}Ga_{0.6}Fe_{1.4}O_{5.15}$, $Sr_{1.7}La_{0.3}Ga_{0.4}Fe_{1.6}O_{5.15}$, $Sr_{1.7}La_{0.3}Ga_{0.2}Fe_{1.8}O_{5.15}$, $Sr_{1.8}La_{0.2}GaFeO_{5.1}$, $Sr_{1.8}La_{0.2}Ga_{0.4}Fe_{1.6}O_{5.1}$ and $Sr_{1.8}La_{0.2}Ga_{0.2}Fe_{1.8}O_{5.1}$.

(d)—compounds of the BIMEVOX family of formula (IV):

$$(Bi_{2-x}M_{x}O_{2})(V_{1-y}M'_{y}O_{z}) \quad (IV)$$

in which M represents one or more metals substituting for bismuth, chosen from those having an oxidation number of less than or equal to 3, M' represents one or more elements substituting for vanadium, chosen from those having an oxidation number of less than or equal to 5, the limiting values of x, y, and therefore z, being dependent on the nature of the substitution elements M and M'. As examples of oxides of formula (IV), there are:

compounds of formula (IVa):

$$(Bi_{2}O_{2})(V_{1-y}M'_{y}O_{z}) \quad (IVa)$$

corresponding to formula (IV) in which x is equal to 0 and y is different from 0 and M' is advantageously selected from alkali metals, alkaline-earth metals, transition metals or elements from Groups III to V of the Periodic Table, or from rare earths.

When M' represents a transition metal, it is more particularly zinc (Zn), copper (Cu), nickel (Ni), cobalt (Co), iron (Fe), manganese (Mn) or cadmium (Cd).

When M' is an alkaline-earth metal, it is especially calcium (Ca), strontium (Sr) or barium (Ba).

However, M' may also represent a metal having an oxidation number equal to 3, such as antimoine (Sb), indium (In) or aluminum (Al), a metal having an oxidation number equal to 4, such as titanium (Ti), tin (Sn) or ruthenium (Ru), or a substitution element having an oxidation number equal to 5, such as niobium (Nb), tantalum (Ta) or phosphorus (P).

M' may also represent an alkali metal such as sodium (Na) or may represent lead ($P_b$) in oxidation state 2.

As examples of compounds of formula (IVa), there are more particularly $Bi_2V_{0.9}CO_{0.1}O_{5.35}$ (called BICOVOX 10) or $Bi_2V_{0.9}Cu_{0.1}O_{5.35}$ (called BICUVOX 10);

compounds of formula (IVb):

$$(Bi_{2-x}M_{x}O_{2})(VO_{z}) \quad (IVb)$$

corresponding to formula (IV) in which y is equal to 0 and x is different from 0, M is as defined above and is more particularly chosen from rare earths such as lanthanum.

Mention may also be made among compounds of formula (IV) of those in which the oxygen atom is partially substituted with fluorine, or else those having mixed bismuth and vanadium substitutions. As compositions of this type, there are, for example, compounds of formula (IVc):

$$(Bi_{2-x}Pb_{x}O_{2})(V_{1-y}Mo_{y}O_{z}).$$

In general, when the ceramic material used is a powder of a compound from the perovskite, brown-millerite family pyrochloror BIMEVOX, the mean particle size is between 0.2 and 50 microns.

According to one particular embodiment of the present invention, the two materials are chosen from doped ceramic oxides as defined above and most particularly from compounds of formulae (I), (II), (III), (Ia), (IIa), (IIIa), (IIIb) or (IIIc) as defined above.

According to another particular embodiment of the present invention, materials A and B have different chemical compositions. In this case, at the use temperature, they are in the form of crystal lattices which are either identical or different.

According to another particular embodiment of the present invention, materials (A) and (B) have the same chemical composition. The solid composition resulting from the method described in the present patent application is distinguished from those of the prior art by its different microstructure, this being characteristic of the method used.

The subject of the invention is also a method and its variant such as those defined above, characterized in that material (B) is chosen from carbides or nitrides such as silicon carbide SiC or silicon nitride $Si_3N_4$, SiAlON, alumina $Al_2O_3$, aluminum silicates or their derivatives such as mullite ($2SiO_2.3Al_2O_3$) or cordierite ($Mg_2Al_4Si_5O_{18}$), magnesia (MgO), calcium phosphates and its derivatives such as hydroxyapatite [$Ca_4$(CaF)($PO_4$)$_3$], tricalcium phosphate [$Ca_3(PO_4)_2$] and undoped ceramic oxides such as zirconia ($ZrO_2$) or ceria ($CeO_2$).

The method as described above is, for example, used to prepare a membrane formed from a porous material (B) supporting a dense mixed conducting ceramic material (A) of different chemical composition.

According to another aspect of the present invention, this relates to a ceramic and/or metallic material obtained by the method as defined above and to a solid-state electrolyte or a mixed ionic/electronic conductor, these being obtained by the variant of said method as defined above.

The subject of the invention is also an electrochemical cell comprising the solid-state electrolyte, as defined above, and a mixed ionically/electronically conducting ceramic membrane comprising a mixed ionic/electronic conductor as defined above.

The subject of the invention is also an ionic/electronic mixed conducting ceramic membrane comprising a material (A) chosen from:

(i)—oxides of formula (I):

in which M represents at least one trivalent or tetravalent atom mainly chosen from bismuth (Bi), cerium (Ce), zirconium (Zr), thorium (Th), gallium (Ga) or hafnium (Hf), a and b are such that the structure $M_aO_b$ is electrically neutral, R represents at least one divalent or trivalent atom mainly chosen from magnesium (Mg), calcium (Ca) or barium (Ba), strontium (Sr), gadolinium (Gd), scandium (Sc), ytterbium (Yb), yttrium (Y), samarium (Sm), erbium (Er), indium (In), niobium (Nb) or lanthanum (La), c and d are such that the structure $R_cO_d$ is electrically neutral and x is generally between 0.05 and 0.30 and more particularly between 0.075 and 0.15, and more particularly stabilized zirconias of formula (Ia):

$$(ZrO_2)_{1-x}(Y_2O_3)_x \quad (Ia)$$

in which x is between 0.05 and 0.15;

(ii)—perovskite materials of formula (II):

in which Ma and Ma', which are identical or different, are chosen from the alkaline-earth, lanthanide and actinide families, and more particularly from La, Ce, Pr, Nd, Pm, Sm, Eu, Gd, Tb, Dy, Ho, Er, Tm, Yb, Lu, Y, or Mg, Ca, Sr or Ba; Mb and Mb' which are identical or different, represent one or more atoms chosen from transition metals, and more particularly from Sc, Ti, V, Cr, Mn, Fe, Co, Ni, Cu, Zn or Ga; x and y, which are identical or different, are greater than or equal to 0 and less than or equal to 1; and w is such that the structure in question is electrically neutral, and more particularly compounds of formula (IIa):

$$La_{0.8}Sr_{0.4}Cu_{0.8}Fe_{0.2}O_w \quad (IIa)$$

in which w is such that the structure of formula (IIa) is electrically neutral, or:

(iii)—materials of the brown-millerite family of formula (III):

in which, Mc represents a metal or a mixture of metals of the family of alkaline-earth (Mg, Ca, Sr or Ba) compounds; Mc' represents a metal or a mixture of metals of the family of lanthanides and actinides and more particularly from La, Ce, Pr, Nd, Pm, Sm, Eu, Gd, Tb, Dy, Ho, Er, Tm, Yb, Lu or Y; Md represents a metal or a mixture of metals of the family of 3d transition metals or metals of group 13; and Md' represents a metal or a mixture of metals of the family of 3d transition metals, metals of group 13, lanthanides or actinides; x and y, which are identical or different, are greater than or equal to 0 and less than or equal to 2; and w is such that the structure in question is electrically neutral and more particularly materials of formula (IIIa):

or of formula (IIIc):

and constituting a dense phase supported by a material (B) chosen from carbides or nitrides such as silicon carbide SiC or silicon nitride $Si_3N_4$, alumina $Al_2O_3$, aluminum silicates or their derivatives such as mullite ($2SiO_2.3Al_2O_3$) or cordierite ($Mg_2Al_4Si_5O_{18}$), magnesia (MgO), calcium phosphates and their derivatives such as hydroxyapatite [$Ca_4(CaF)(PO_4)_3$], tricalcium phosphate [$Ca_3(PO_4)_2$] and undoped ceramic oxides such as zirconia ($ZrO_2$) or ceria ($CeO_2$) and constituting a porous support.

This membrane is preferably prepared by the method as defined above.

The membrane as defined above may furthermore include a reforming catalyst applied to the external face of the dense phase of material (A).

According to another aspect of the present invention, this relates to the use of the solid-state electrolyte obtained by the variant of the method as defined above, to extract oxygen from a gaseous mixture containing it or to analyze the presence of oxygen in a gaseous atmosphere. Mention may be made in particular of the use of the solid-state electrolyte obtained by the variant of the method as defined above either to produce ultrapure oxygen in a vacuum or not or, in applications requiring oxygen-free atmospheres or atmospheres having a low oxygen content, such as the electronic components industry or the food industry, to remove oxygen from said atmosphere or to reduce the oxygen content, said gaseous atmosphere being above a solid or a liquid.

This is why the subject of the invention is also a method for producing ultrapure oxygen, consisting in separating oxygen from air by ionic conduction through an electrochemical cell as defined above and a method for reducing or even eliminating oxygen from a gaseous atmosphere in which applications requiring oxygen-free atmospheres or atmospheres having a low oxygen content are carried out, consisting in separating oxygen from said atmosphere by ionic conduction through an electrochemical cell as defined above.

It is also possible to use an ionic conducting ceramic membrane as defined above to produce oxygen which is used directly in a chemical reaction, especially with hydrogen in order to produce electrical energy, for example, in a solid-state fuel cell of the SOFC type.

This is why the subject of the invention is also a method for producing thermal and electrical energy within a solid-state fuel cell, by the reaction of oxygen with hydrogen, characterized in that said oxygen is obtained by separating it from air, by ionic conduction through a ceramic membrane and more particularly through a supported ceramic membrane, either on the anode (fuel side) or on the cathode (air side), as defined above.

According to another aspect of the present invention, this relates to the use of a mixed conducting ceramic membrane, supported on a porous support having a chemical composition identical to or different from the dense membrane, as a catalytic membrane reactor in a method for producing syngas by the catalytic reaction of natural gas optionally with steam and oxygen, characterized in that said oxygen is obtained by separating it from air, by mixed ionic/electronic conduction through the dense ceramic membrane as defined above.

Another subject of the invention is the use of the article described above in a method for producing ultrapure oxygen, characterized in that said oxygen is separated from air by mixed ionic/electronic conduction through a supported ceramic membrane as defined above.

Another subject of the invention is the use of a supported ceramic membrane as defined above in an industrial process for synthesizing an organic compound from hydrocarbon-based molecules, comprising at least one oxidation step, catalytic or non-catalytic, using gaseous oxygen, characterized in that said oxygen is obtained by separating it from air, by mixed ionic/electronic conduction through a ceramic membrane as defined above.

In all situations of the membrane catalytic reactor, a catalyst corresponding to the expected catalytic reaction, for example a reforming reaction or a provided oxidation reaction, is, either dispersed on the surface of the supported dense thin membrane or deposited in powder form or extruded in direct contact with the membrane system.

Finally, the subject of the invention is the use of a composition obtained by the method as defined above, in order to produce filter membranes for gases or liquids, ceramic-to-metal seals, biomaterials or sensors. In this composition formed from three phases—material (A), material (B) and pores—the concentration of each of the phases varies continuously from one face of the article to the other along a continuous controlled gradient.

As "dense" ceramic membrane material (A) and "porous support" material B that are used in these applications, there are, for example, in the case of material (B) either carbides or nitrides such as silicon carbide SiC or silicon nitride $Si_3N_4$, alumina $Al_2O_3$, aluminum silicates or their derivatives such as mullite ($2SiO_2.3Al_2O_3$), SiAlON or cordierite ($Mg_2Al_4Si_5O_{18}$), magnesia (MgO), or calcium phosphates and its derivatives such as hydroxyapatite [$Ca_4(CaF)(PO_4)_3$], tricalcium phosphate [$Ca_3(PO_4)_2$] or undoped ceramic oxides such as zirconia ($ZrO_2$) or ceria ($CeO_2$) or a mixture of one or more of these compounds. The "dense" ceramic membrane material A, in the applications described above, is either a purely ionic conductor or a mixed ionic/electronic conductor of cubic phase, fluorite phase, perovskite phase, of brown-millerite phase, of the Aurivillius-type family or of pyroclore phase. The figures appended to this description illustrate the invention without however limiting it.

Figure 1:
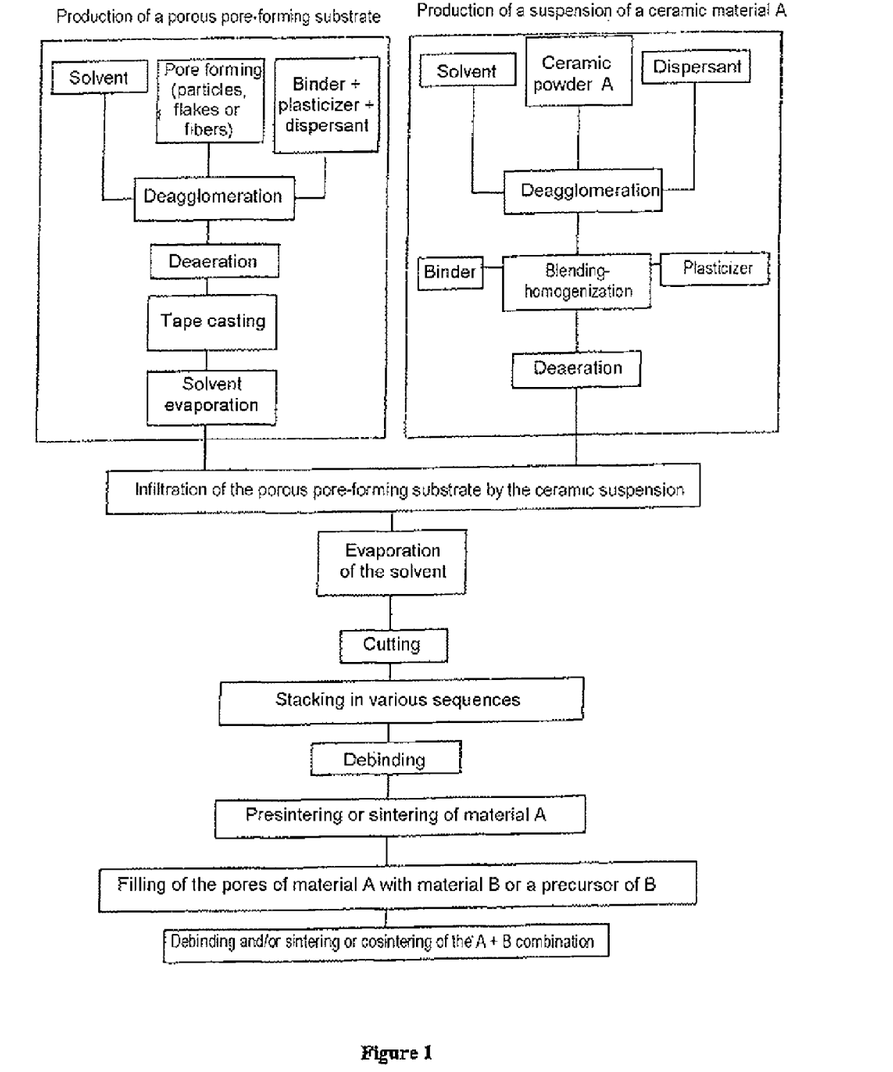
FIG. 1 illustrates the various steps of the method for producing a ceramic membrane formed mainly from a thin material (A) having a surface concentration gradient of a material (B).

FIG. 1 is a collection of the various steps of the method for producing a ceramic membrane formed mainly from a thin material (A) having a surface concentration gradient of a material (B).

Figure 2:
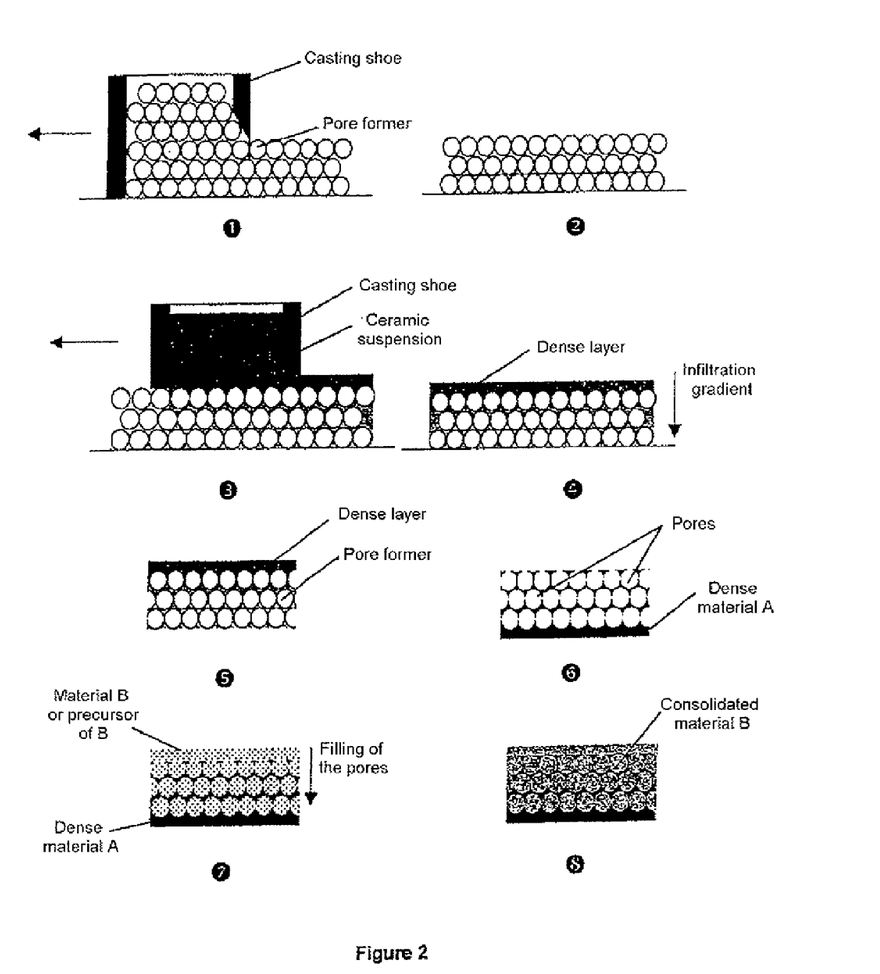
FIG. 2 illustrates the method of preparing a ceramic membrane mainly formed from a thin material (A) having a surface concentration gradient of a material (B).

FIG. 2 illustrates the method of preparing a ceramic membrane mainly formed from a thin material (A) having a surface concentration gradient of a material (B). The steps are the following:
1) Production of a porous pore-forming substrate by tape casting, on a flexible plastic film (Mylar™ for example), of a suspension of pore-forming particles (solvent+pore formers+organics);
2) Evaporation of the solvent;
3) Infiltration of the porous pore-forming substrate by a ceramic suspension of controlled viscosity and controlled rheological behavior. The viscosity and the rheological behavior determine the infiltration of the suspension into the porous pore-forming substrate and therefore the porosity gradient;
4) Evaporation of the solvent;
5) Cutting of the tape;
6) Debinding-sintering or debinding-presintering;
7) Total or partial filling of the pores created on the surface of material (A) with a material (B) or a precursor of material (B); and
8) Binding and sintering or debinding and cosintering of the A+B combination.

Figure 3:
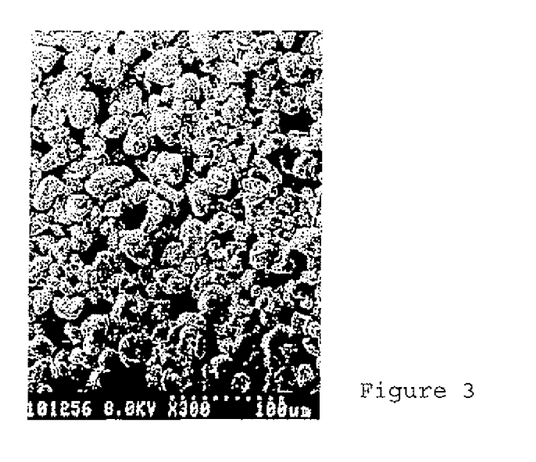
FIG. 3 is a photograph obtained by scanning electron microscopy of the surface of a porous pore-forming substrate.

FIG. 3 is a photograph obtained by scanning electron microscopy of the surface of a porous pore-forming substrate consisting of a stack of micronized polypropylene wax particles 25 μm in size, manufactured by MicroPowders, Inc.)

Figure 4:
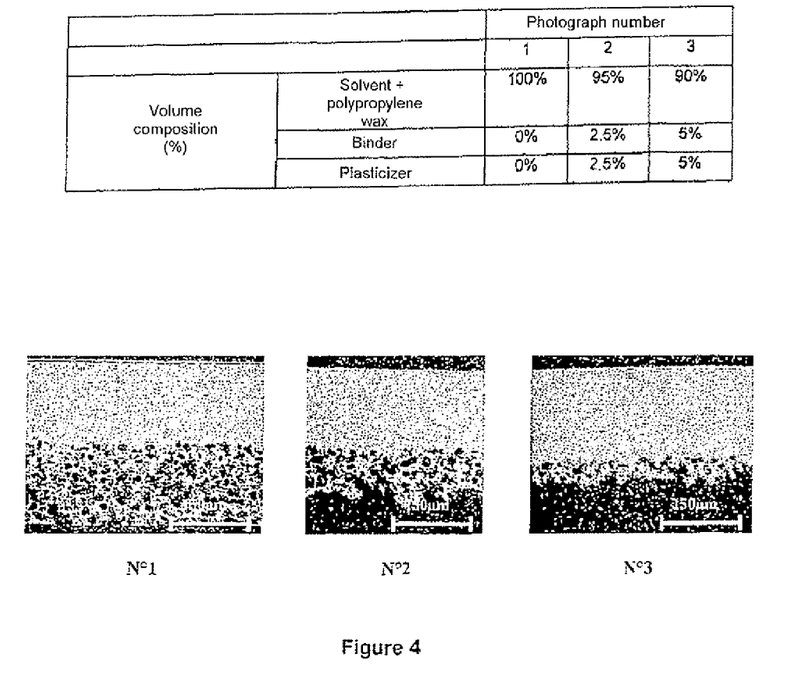
FIG. 4 is a collection of various photographs obtained by scanning electron microscopy of polished sections of sintered material (A) obtained by infiltration of a porous pore-forming substrate by a BICOVOX 10 suspension (material (A)).

FIG. 4 is a collection of various photographs obtained by scanning electron microscopy of polished sections of sintered material (A) obtained by infiltration of a porous pore-forming substrate by a BICOVOX 10 suspension (material (A)). The BICOVOX 10 suspension is formed from about 30 to 50 g of BICOVOX 10 powder (particle size<1 μm), 0.2 g to 2 g of BEYCOSTAT™ A259 dispersant sold in France by CECA—Atochem, 0.5 g to 5 g of DEGALAN™ LP 51/07 binder sold in France by Degussa—Hüls and 0.5 g to 5 g of dibutyl phthalate in a methyl ethyl ketone/ethanol mixture so that the volume ratio of dry matter to the volume of solvent is between 25% and 35%. The substrate consists of a stack of 25 μm micronized polypropylene wax particles (MicroPowders Inc.) with a variable proportion of organic materials ensuring cohesion of the particles. This example illustrates the effect of the composition of the porous pore-forming substrate on the infiltration of a ceramic tape-casting suspension. The total porous zone was estimated to be approximately 60% by image analysis.

Figure 5:
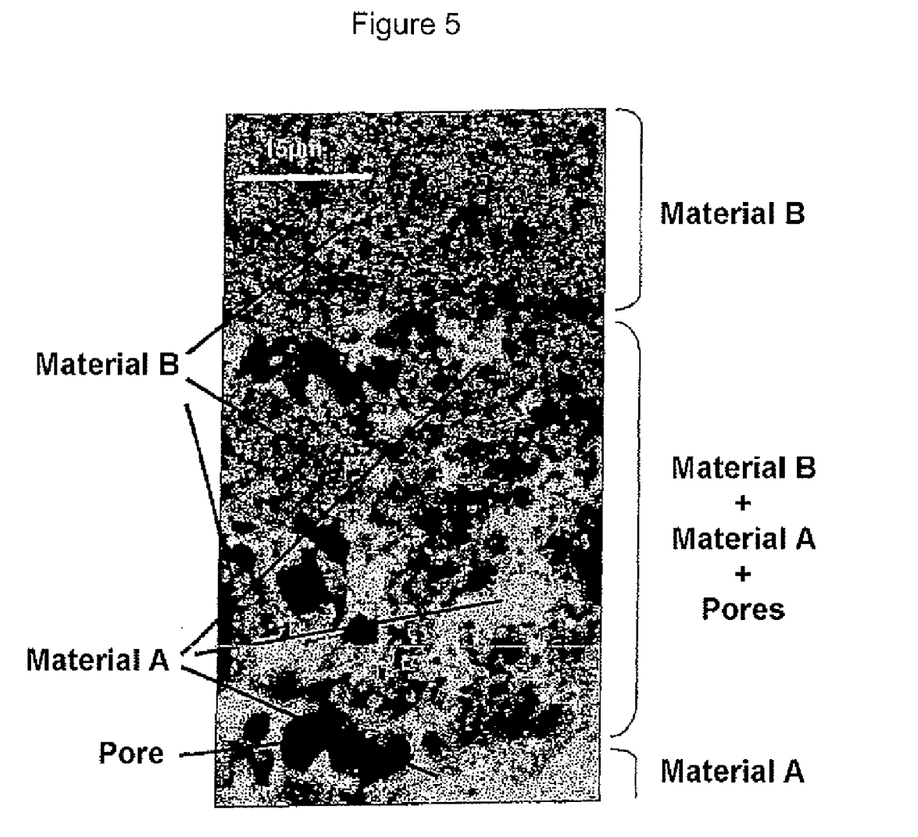
FIG. 5 is a photograph obtained by scanning electron microscopy of a polished section of the interface between two ceramic materials A and B, BICOVOX 10 (A) and a material (B) of perovskite structure, respectively.

FIG. 5 is a photograph obtained by scanning electron microscopy of a polished section of the interface between two ceramic materials A and B, BICOVOX. 10 (A) and a material (B) of perovskite structure, respectively. This interface has a structure of the A/A+B/B type obtained by infiltration of the pores of a ceramic membrane of material (A) by a suspension of material (B); the whole assembly is then cosintered. The ceramic membrane of material (A) was produced beforehand by infiltration of a porous pore-forming substrate consisting of pore-forming particles having a diameter from 10 to 15 μm, then binding and sintering. Material (A) is dense. Material (B) has a final porosity, said material being sintered at the sintering temperature (700 to 800° C.) of material (A), a temperature below the sintering temperature of material (B). It may be considered that a porous electrode layer B has been deposited on a dense support A.

Figure 6:
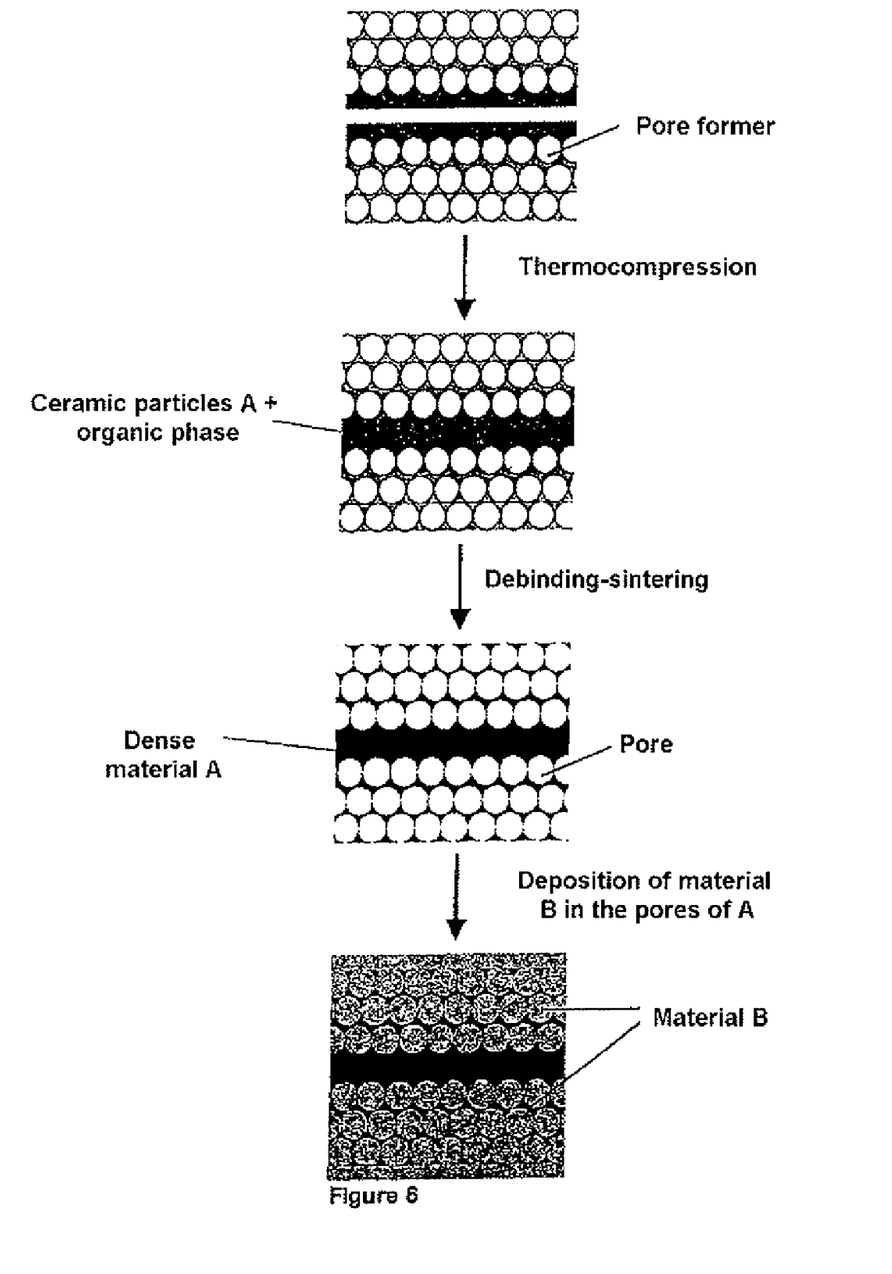
FIG. 6 illustrates the manufacture of porous/dense/porous multilayer elements by thermocompression, in the green state, of a stack of two back-to-back tapes of a material (A), which tapes are produced by the method of infiltrating a porous pore-forming substrate with a suspension of ceramic material A.

FIG. 6 illustrates the manufacture of porous/dense/porous multilayer elements by thermocompression, in the green state, of a stack of two back-to-back tapes of a material (A), which tapes are produced by the method of infiltrating a porous pore-forming substrate with a suspension of ceramic material A. A material (B) is then deposited in the pores of the ceramic article.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A mixed ionic/electronic conducting membrane that comprises
a thin solid composition consisting of at least one component of a ceramic material (A) said thin solid composition having within said material (A)
a surface concentration gradient consisting of at least one component of a ceramic and metallic material
wherein said material (A) is selected from the oxides of formula (I):

(I), wherein M is at least one trivalent or tetravalent atom selected from the group consisting of Bi, Ce, Zr, Th, Ga, and Hf;

wherein a and b are such that the structure $M_aO_b$ is electrically neutral;

wherein R is at least one divalent or trivalent atom selected from the group consisting of Mg, Ca, Ba, Sr, Gd, Sc, Yb, Y, Sm, Er, In, Nb, and La;

wherein c and d are such that the structure $R_cO_d$ is electrically neutral;

and wherein x is in the range of about 0.05 to about 0.30.

2. The mixed ionic/electronic conducting membrane according to claim 1, wherein said x is in the range of about 0.075 to about 0.15.

3. The mixed ionic/electronic conducting membrane according to claim 1, wherein said material (A) is selected from the stabilized zirconias of formula (Ia):

$$(ZrO_2)_{1-x}(Y_2O_3)_x \qquad (Ia)$$

wherein said x is in the range of about 0.05 to about 0.15.

4. The mixed ionic/electronic conducting membrane according to claim 1, wherein said membrane is a catalytic membrane reactor adapted to produce syngas by the catalytic reaction of natural gas.

5. The apparatus mixed ionic/electronic conducting membrane according to claim 4, wherein said reaction further comprises steam and oxygen, and wherein said oxygen is obtained by separating it from air, and by mixing ionic/electronic conduction through said membrane.

6. The mixed ionic/electronic conducting membrane according to claim 1, wherein said membrane is adapted to synthesize an organic compound from hydrocarbon-based molecules-through at least one catalytic or non-catalytic oxidation step using gaseous oxygen, and wherein said oxygen is obtained by separating it from air, by mixed ionic/electronic conduction through said membrane.

* * * * *